United States Patent Office 3,703,536
Patented Nov. 21, 1972

3,703,536
PREPARATION OF OIL-SOLUBLE BORON DERIVATIVES OF AN ALKYLENE POLYAMINE-SUBSTITUTED PHENOL-FORMALDEHYDE ADDITION PRODUCT
Edmund J. Piasek, Chicago, Ill., Robert E. Karll, Munster, Ind., and Richard J. Lee, Park Forest, Ill., assignors to Standard Oil Company, Chicago, Ill.
No Drawing. Filed Nov. 24, 1967, Ser. No. 685,254
Int. Cl. C07f 5/04
U.S. Cl. 260—462 R        4 Claims

ABSTRACT OF THE DISCLOSURE

Complex substituted alkylene polyamines such as di (alkenylsuccinimide) of $N_1,N_3$ symmetrical bis(aminopolyazalkylene) ureas and oil-soluble products derived by the reaction of p-alkylphenols, formaldehyde and alkylene polyamines that react with boric acid in oil solution either with low boric acid utilization efficiency or react to form a hazy product whose haze cannot be removed by filtration are readily converted to the desired oil solution of boron and nitrogen containing products by first preparing an oil solution of super boron containing product of the complex substituted alkylene polyamine, combining the oil solution of super boron containing product with oil solution of the complex substituted alkylene polyamine and equilibrating the resulting mixture to a uniform boron to nitrogen content throughout.

BACKGROUND

Borated derivatives of acylated nitrogen-containing compounds such as amines, polyamines and hydroxy amines have been described as useful detergent-dispersant compounds, for example in U.S. Pats. 2,216,618, 3,000,916 and 3,087,936. Boric acid is one of the reactants found most useful for the preparation of those borated acylated nitrogen-containing compounds. Boric acid can react with a hydrogen attached to a nitrogen of an amine or with the hydroxyl group of a hydroxy amine and in both cases water is a by-product. Such reactions of boric acid are not simple but rather are complex. For example, more than one mole of boric acid can react with each equivalent of secondary amino group

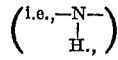

in the acylated nitrogen-containing compounds. This reaction between boric acid and the types of acylated nitrogen-containing compounds disclosed in U.S. Pats. 2,216,618, 3,000,916 and 3,087,936 is rather straightforward. The acylated nitrogen-containing compound and the amount of boric acid to give the desired boron to nitrogen ratio (ratio of gram atom of boron to gram atom of nitrogen) are combined and the mixture heated to drive off by-product water. Solid boric acid suspensions of boric acid in alcohols such as methanol or in hydrocarbons and aqueous solutions of boric acid can be added to the acylated nitrogen-containing compounds or solutions thereof. Removal of alcohol and solvent water and/or by-product water (water of reaction) is accomplished by heating the mixture of boric acid and acylated nitrogen-containing reactants at atmospheric pressure or reduced pressure (subatmospheric pressure) with or without a gas sweep or purge. The means selected to remove by-product water is a matter of choice and is generally selected on the basis of efficiency of by-product water removal in the shortest time. The reactants should be combined under conditions that do not favor the formation of unreactive species of boric acid by its dehydration. Thus when the acylated nitrogen-containing reactant is at a temperature at or above the normal boiling point of water it is convenient to prevent such a dehydration to add water with boric acid. This amount of water need not be sufficient to dissolve the boric acid for a lesser amount of water is suitable for this purpose. Usually when the reactants are combined at temperatures below 100° C. there is no need to add water. However a small amount of water or alcohol, especially methanol, has a promoting effect on the reaction between boric acid and the acylated nitrogen-containing compound.

Insofar as can be ascertained from the three patents mentioned before the utilization of boric acid is efficient. In other words, the ratio of gram atoms of boron to nitrogen in the reactants boric acid and acylated nitrogen-containing compound used is generally the same as the ratio of gram atoms of boron to nitrogen in the borated product. The same efficient boric acid utilization has been experienced in our laboratories and commercial practices when preparing borated acylated nitrogen-containing compounds from boric acid and the acylated nitrogen-containing compounds of the types disclosed and described in the three patents mentioned before. However, when we have tried to borate with boric acid certain acylated nitrogen-containing compounds and nitrogen-containing compounds having 2 - hydroxy - 5-alkylbenzyl and 2-hydroxy-5-alkyl xylyl substituents on their nitrogens that are more complex than the acylated nitrogen-containing compounds described and disclosed in those three patents, we have not been able to achieve a high efficiency of boric acid utilization. In some cases the unreacted boric acid can be removed by filtration aided by finely divided filter aid but in other cases a hazy product forms that cannot be clarified by any filtration process. These problems persist even when normal amounts of boration promoters are used. But the haze problem can be overcome by the use of large excesses of water of the magnitude needed to dissolve the boric acid. Such amounts of water may be satisfactory for laboratory or other small scale practices but are not satisfactory for commercial practices. In those cases where unreacted boric acid can be removed with the use of a filter aid, the desired gram atomic boron to nitrogen ratio (B/N) can be achieved by the use of gross excesses of boric acid but this practice represents a loss of reactant because the unreacted boric acid is so mixed with filter aid as not only to make recovery of that boric acid commercially unattractive but to result in plugging of the filter and make filtration commercially unattractive.

The more complex acylated nitrogen-containing compounds with which we have experienced difficulty in borating with boric acid have in their molecular structure either a carbonyl group linking two aminoazalkylene groups whose terminal amino groups have been acylated or a phenolic hydroxyl group. We have, however, found an efficient technique for borating such more complex nitrogen-containing compounds to the desired boron content by an indirect route that provides high boric acid utilization, up to 95 to 98%. This technique and a more precise characterization of the more complex nitrogen-containing reactant will be described and defined in the following sections.

SUMMARY OF THE INVENTION

We have found difficult to borate with boric acid in the usual manner oil-soluble substituted alpha, omega-aminopolyazalkylenes having as substituents on their terminal nitrogens a group with a phenolic hydroxyl as in a 2-hydroxybenzyl or a 2-hydroxy-1,3-xylyl type group or a substituted bis-(alpha,omega-aminopolyazalkylene) urea or thiourea having as terminal nitrogen-containing groups an alkenylsuccinimido group substituent or a group with a phenolic hydroxyl of the type mentioned above. We have found an advantageous technique for borating with boric acid the above class of oil-soluble substituted alpha,omega - aminopolyazalkylene and bis (alpha,omega - aminopolyazalkylene)urea nitrogen-containing compounds to a uniform boron content in the final product. This technique comprises superborating those nitrogen-containing compounds with boric acid, then mixing the superborated product with unborated nitrogen-containing compound and equilibrating the resulting mixture to a uniform boron to nitrogen content throughout. We have also discovered that the superboration can be readily conducted without the aforementioned haze problem or non-reaction of boric acid.

The equilibration can be accomplished by storing the mixture of superborated and unborated nitrogen-containing compounds at ambient temperature. Usually storage for about twenty-four to forty-eight hours at ambient temperature is suitable. The equilibration time can be reduced by heat. The equilibration occurs in less than one hour at a temperature of 200° to 250° F. and in one to four hours at temperatures of 120° to 200° F. The product after equilibration is no longer a mixture of superborated and unborated nitrogen-containing compound but rather is a single species of borated compound with uniform boron content throughout. It appears that there is an exchange of boric acid moiety from the superborated species to the unborated species so that the product after equilibration is really a new borated species with a uniform but lower boron content throughout.

The oil-soluble nitrogen-containing compounds normally difficult to borate with boric acid are exceptionally useful dispersant-detergent addition agents for lubricating oils. The borated products are more useful as dispersant-detergent addition agents for certain lubricating oil compositions than are the unborated precursors because the borated products have been found to be more compatible with antirust, anti-corrosion, anti-wear and anti-oxidant addition agents. For lubricant oil compositions requiring metal salt anti-wear, corrosion, wear and oxidant agents and highly efficient dispersant-detergent agents for successful lubricating life under severe service conditions such as encountered in suburban type stop and go short travel as well as occasional high speed, long distance highway travel, the use of the borated dispersant-detergent addition agent permits the use of less of those metal salt type addition agents. The unborated nitrogen-containing addition agents of the difficultly borated type appear to complex with some of those metal salt type addition agents and prevent them from performing their primary function. Without boration of those difficultly borated type nitrogen-containing oil-soluble dispersant-detergent addition agents there must be used with them large amounts of the metal salt addition agents to achieve their desired primary function so that complexing of some of them by the nitrogen-containing difficultly borated dispersant-detergent addition agents will not leave the lubricating oil composition deficient in the primary function of the metal salt addition agents.

Returning now to the technique of borating with boric acid the normally difficultly borated oil-soluble nitrogen-containing lubricating oil addition agents, we shall define what we mean by "superborated." Those difficultly borated nitrogen-containing addition agents all contain moieties of alpha, omega aminopolyazalkylenes with which boric acid can react in ratios up to about ten gram moles boric acid per gram atom nitrogen. The difficulty in boric acid boration arises in reacting ratios of less than about one gram mole boric acid per gram atom nitrogen. The ease in boration with boric acid appears to increase as one goes upward from the use of ratios from about one gram mole boric acid per gram atom nitrogen. Although a ratio of about ten gram moles boric acid per gram atom nitrogen can be used the problems of handling such large amounts of boric acid, the longer reaction time to react all of the boric acid and the difficulty in processing the resulting high boron product offset the advantages of using such high ratios of boric acid. Ease of processing and advantages of superborating are desirably achieved with ratios of 1 to about 8 gram moles boric acid and preferably achieved with 3 to 6 gram moles boric acid per gram atom nitrogen. Preference has arisen for the use of the borated products as lubricant oil addition agents that have a weight ratio of boron to nitrogen in the range of 0.2 to 0.3 because those borated products not only retain substantially all of the dispersancy-detergency of the unborated precursor but also maximize the desired compatibility with metal salt lubricating oil addition agents. That boron to nitrogen weight ratio range represents a gram atom ratio of boron per gram atom nitrogen in the range of about 0.26 to 0.39. To obtain those gram atom ratios of boron to nitrogen from a superborated product having a gram atom ratio of 1.0 boron per gram atom nitrogen by the equilibration step, there would be combined and equilibrated about three moles of the same nitrogen content unborated species with one mole of the superborated product and about three moles of the same nitrogen content unborated species with two moles superborated product, respectively. As the gram atom ratio of boron to nitrogen is increased in the superborated product, advantageously the greater becomes the amount of the unborated species that can be equilibrated with the superborated product. Also as the gram atom ratio of boron to nitrogen increases in the superborated product, the amount of final equilibrated product with a gram atom ratio of boron to nitrogen in the range of about 0.26 to 0.39 increases. Thus for a particular total commercial capacity of final product of gram atom ratio of boron to nitrogen in the range of about 0.26 to 0.39 as the boron to nitrogen ratio in the superborated product increases above 1:1 the number of superboration preparations decreases.

For a better understanding of this invention the nitrogen-containing dispersant-detergent addition agents difficultly borated will be described. The difficultly borated nitrogen-containing detergent-dispersant addition agent compounds are advantageously prepared as solutes in a light mineral oil solvent of lubricating quality. For example, light white oils to solvent extracted or solvent extracted and hydrogenated lubricating oil base stocks such as SAE5W to SAE10 type oils are useful solvents. Those solutions of difficulty borated nitrogen-containing dispersant-detergent addition agent compounds are prepared as concentrates having 30 to 50 weight percent, preferably 40 to 45 weight percent, of the solute. As before described the complex difficultly borated nitrogen-containing dispersant-detergent addition agents are of two types. The first type contain a carbonyl or thiocarbonyl group joining two moieties of a mono-(alkenyl substituted succinimide) of an alpha, omega-aminopolyazalkylene compound wherein the alkenyl substituent on the succinimide group has thirty or more carbon atoms. These nitrogen-containing dispersant-detergents are conveniently prepared by the condensation of urea or thiourea with a alpha omega-aminopolyazalkylene compound (alkylene polyamine) having the formula:

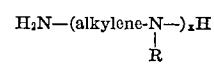

wherein alkylene is a divalent saturated hydrocarbon group of 1 to 8 carbon atoms, R is hydrogen or a lower alkyl hydrocarbon group having 1 to 4 carbon atoms and x is an integer of from 2 to about 10. Illustrative of the alpha,omega-aminopolyazalkylene compounds are mono-, di-, tri-, tetra-, penta-, hexa-, hepta-, octa-, nona- and deca-ethylene or propylene di-, tri-, tetr-, pent-, hex-, hept-, oct-, non-, dec- and undec-amines, methylamines, ethylamines, etc. and their higher alkylene homologs.

The urea or thiourea condensations with alpha-omega-amino-polyazalkylene compounds are carried out in the presence of a light oil solvent by reacting with each mole of urea or thiourea two moles of alpha-omega-polyazalkylene compound under conditions liberating and driving off two moles of ammonia. Then the resulting light oil solution of the condensation product is combined with a light oil solution of the alkenyl substituted succinic anhydride in an amount to provide two moles of alkenyl substituted succinic anhydride per mole of condensation product. The condensation product can have the formula when R is hydrogen or lower alkyl:

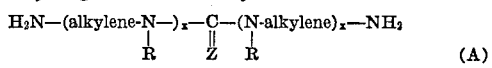

(A)

or the formula when R is hydrogen:

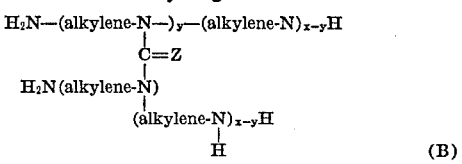

(B)

wherein alkylene, R and $x$ all are as before defined and $y$ is $$\frac{x}{2} \text{ or } \frac{x+1}{2}$$

and Z is oxygen or sulfur. In the alkenylsuccinimide final product the nitrogen of each of the alkenylsuccinimido groups is one of the nitrogens of a terminal primary amino group. These final products include compounds having the structure:

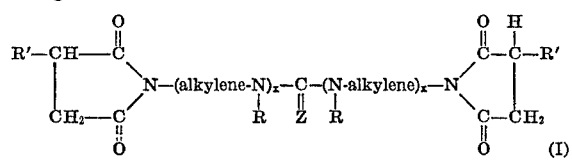

(I)

wherein R' is an alkenyl hydrocarbon group having 30 or more even up to 20,000 carbon atoms, preferably derived from polypropylene or a polybutene such as polyisobutylene. The alkenyl substituted succinic anhydride reactant and its preparation from maleic anhydride are known from the prior art.

The second class of complex difficultly borated nitrogen containing dispersant-detergent addition agents are also derivatives of alpha,omega amino polyazalkylene compounds but are derived from a multistep preparation also using alkyl phenols, mainly p-alkylphenols, and a source of formaldehyde. The alkyl phenol preferably contain 30 to 20,000 carbon atoms in the alkyl group. This second class of complex nitrogen-containing dispersant-detergent addition agents are also prepared as solutes in light mineral oil solvents of the type previously defined. In the first reaction step the reactants are used in equimolecular proportions and the reaction carried out under conditions to remove by-product water. For example, a light oil solution of 1700 molecular weight alkyl phenol, formaldehyde and alpha,omega amino polyazalkylene or condensation product of Formulae A and/or B in the mole ratio of 1:1:1 are combined at 180–200° F. with stirring. The heat of reaction is not removed. The stirred reaction mixture is heated to drive off by-product water. Then to each mole of the first step 1:1:1 product there is added either a source of formaldehyde to provide 0.5 mole formaldehyde or an 0.5 mole saturated hydrocarbyl substituted phenol having 2 to 20,000 carbon atoms in the hydrocarbyl group and a source of formaldehyde to provide 1.0 mole formaldehyde. This second reaction mixture is stirred and heated to drive off by-product water.

The types of compounds of this second class of complex nitrogen-containing dispersant-detergent addition agents can be illustrated by the following structural formulae:

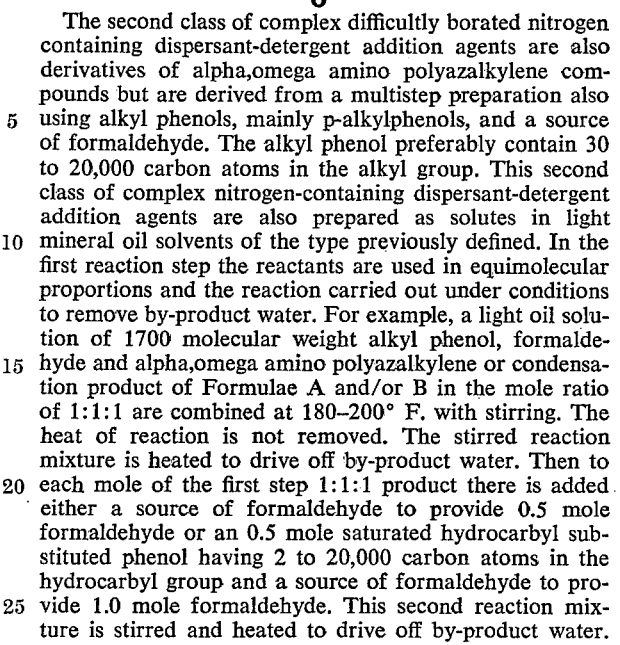

(II)

(III)

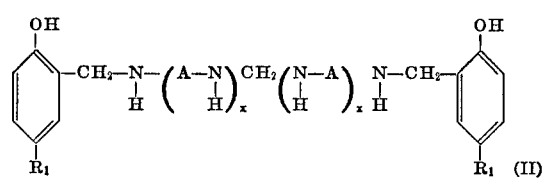

(IV)

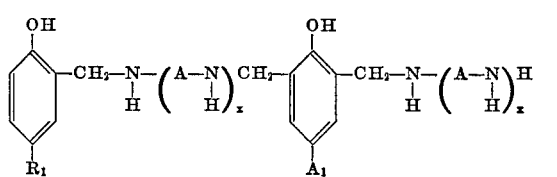

(V)

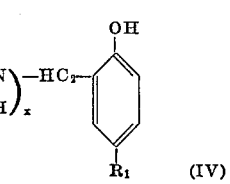
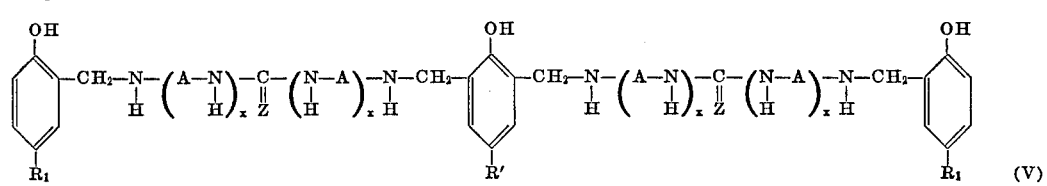

(VI)

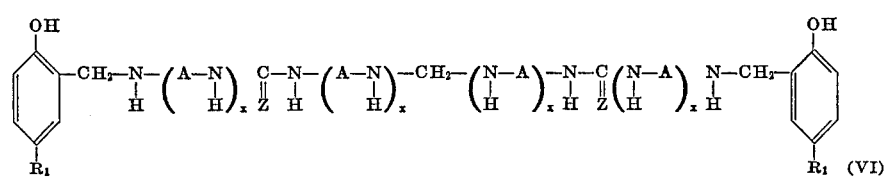

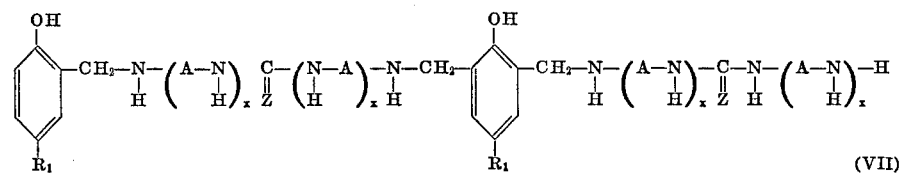

(VII)

wherein A is the saturated divalent alkylene hydrocarbon group of 2 to 8 carbon atoms, $x$ is 1 to 10, Z is oxygen or sulfur, $R_1$ is the alkyl hydrocarbon group of from 50 to 20,000 carbon atoms, and R' is the saturated hydrocarbyl group of from 2 to 20,000 carbon atoms.

The complex nitrogen-containing difficultly boric acid borated compounds illustrated by structural Formulae I through VII can be named in the following manner keyed to the respective formula number.

FORMULA I di(alkenylsuccinimide) of $N_1,N_3$ symmetrical bis (aminopolyazalkylene) urea whose alkenyl group has 30 or more carbon atoms

FORMULA I THIOCARBONYL ANALOG di(alkenylsuccinimide) of $N_1,N_3$ symmetrical bis (aminopolyazalkylene) thiourea whose alkenyl group has 30 or more carbon atoms

FORMULA II

N,N'-bis(2-hydroxy-5-alkylbenzyl aminopolyazalkylene) diaminomethane

FORMULA III

N-mono(2-hydroxy-5-alkylbenzyl) substituted 2-hydroxy-5-alkyl - 1,3 - di(aminopolyazalkylene aminomethyl) benzene

FORMULA IV

N,N'-bis(2-hydroxy-5-alkylbenzyl) substituted 2-hydroxy-5-hydrocarbyl - 1,3 - di(aminopolyazalkylene aminomethyl) benzene

FORMULA V

N,N'-bis(2-hydroxy-5-alkylbenzylaminopolyazalkylenecarbonylaminopolyazalkylene) diaminomethane

FORMULA V THIOCARBONYL ANALOG

N,N'-bis(2-hydroxy-5-alkylbenzylaminopolyazalkylenethiocarbonylaminopolyazalkylene) diaminomethane

FORMULA VI

N - mono(2 - hydroxy-5-alkylbenzyl) substituted 2-hydroxy - 5 - alkyl - 1,3-di(aminopolyazalkylenecarbonylaminopolyazalkyleneaminomethyl) benzene

FORMULA VI THIOCARBONYL ANALOG

N - mono(2 - hydroxy - 5-alkylbenzyl) substituted 2-hydroxy - 5 - alkyl - 1,3-di(aminopolyazalkylenethiocarbonylaminopolyazalkyleneaminomethyl) benzene

FORMULA VII

N,N' - bis(2 - hydroxy-5-alkylbenzyl) substituted 2-hydroxy - 5 - hydrocarbyl-1,3-di(aminopolyazalkylenecarbonylpolyazalkyleneaminomethyl) benzene

FORMULA VII THIOCARBONYL ANALOG

N,N' - bis(2 - hydroxy-5-alkylbenzyl) substituted 2-hydroxy - 5 - hydrocarbyl - 1,3-di(aminopolyazalkylenethiocarbonylpolyazalkyleneaminomethyl) benzene Boration with boric acid by the combination of superboration and equilibration of mixtures of compounds having the structural Formulae II and III, or VI and VII are also within this invention.

Both of the foregoing types of complex nitrogen-containing dispersant-detergent addition agents that preferably are converted to boric acid borated derivatives according to the superboration and equilibration technique of this invention are those derived from tetraethylene pentamine or a commercial mixture of ethylene polyamines having the nitrogen content of tetraethylene pentamine or pentaethylene hexamine or a commercial mixture of ethylene polyamines having a nitrogen content of pentaethylene hexamine or mixtures of tetraethylene pentamine and pentaethylene hexamine or mixtures of those two commercial ethylene polyamines.

The two classes of complex difficultly boric acid borated nitrogen-containing dispersant-detergent addition agents are no part of our invention because the discovery of those two classes of complex products are the inventions of our co-workers.

The following comparative and illustrative examples are presented to assist the understanding and practice of the present invention and to illustrate the problems associated with the boric acid borated derivatives of the two different classes of nitrogen-containing products before defined. For the sake of convenience and to eliminate repetition of descriptive matter that is not a part of this invention, the preparation of two species each of those two different classes of nitrogen-containing products will be first described.

Preparation of Species A of di(alkenylsuccinimide) of $N_1,N_3$-symmetrical bis(aminopolyazalkylene) urea There is first prepared a $N_1$, $N_3$-symmetrically substituted bis(aminopolyazalkylene) urea by the condensation reaction of urea and tetraethylene pentamine used in the mole ratios of two moles of tetraethylene pentamine for each mole or urea. Into a 2000 gallon reaction kettle having a jacket for heating and/or cooling the kettle's contents and having a stirrer there are metered 626 gallons (5,400 pounds or 27.5 pound moles) commercial tetraethylene pentamine (a mixture of polyamines having an average of five nitrogens and average of five ethylene groups per molecule). The polyamine is stirred and heated to 115° F. by steam in the jacket of the kettle. To the stirred polyamine there is added 800 pounds (13.33 pound moles) urea at about 60 pounds per minute. The resulting stirred mixture is heated to 240° F. as rapidly as possible and then heated over a 3 to 4 hour period to 300° F. and is held at 300° F. for about three hours. Ammonia evolves from the reaction mixture during heating it from 240° F. to 300° F. and while it is held at 300° F. To aid the removal of by-product ammonia, inert gas, such as nitrogen, is injected into the liquid reaction mixture. The condensation reaction product has a molecular weight of about 400 and a nitrogen content of about 31% by weight. The theoretical product from the condensation of exactly two moles tetraethylene pentamine with one mole of urea would have a molecular weight of 404 and a nitrogen content of about 34.65 weight percent. However, because the commercial tetraethylene pentamine is a mixture of tri-, tetra- and hexa-ethylene tetra-, penta- and hexa-amines whose nitrogen content is the same as that of tetraethylene pentamine and because of incomplete reaction and escape of reactants, the final product has about 31 weight percent nitrogen, an amount slightly below the theoretical amount.

The $N_1,N_3$-symmetrically bis-substituted urea is reacted with polybutenyl substituted succinic anhydride of 960 molecular weight (the polybutenyl substituent is from a liquid viscous polybutene of about 860 molecular weight) to form Species A. This is accomplished by adding to another 2000 gallon jacketed reaction vessel before described 7020 pounds of solution containing 3790 pounds of the 960 molecular weight polymer substituted succinic anhydride dissolved in a mixed solvent consisting of SAE-5W oil and substantially saturated 860 molecular weight branched chain alkane compound of the liquid viscous polybutene. The solution is blanketed with a nitrogen atmosphere, diluted with about 200 gallons of SAE-5W oil, stirred and heated with steam in the kettle's jacket to 250–260° F. Then to this hot stirred solution there is added in about 30 to 40 minutes 83.8 gallons of the $N_1,N_3$-symmetrically bis-substituted urea containing 31% nitrogen by weight. The resulting mixture is heated to 300° F. and held at 300° F. for about 2 hours while injecting nitrogen gas into the hot, stirred liquid to assist removal of by-product water. The resulting solution contains Species A as solute and has a nitrogen content of about 2.4 weight percent.

Preparation of Species B of di(alkenylsuccinimide) of $N_1,N_3$-symmetrical bis(aminopolyazalkylene) urea There is first prepared a different $N_1,N_3$-symmetrically bis-substituted urea from urea and a 1:1 volume mixture of tetraethylene pentamine and pentaethylene hexamine. The same procedure and mole ratio of reactants are used as described before for the preparation of the tetraethylene pentamine-urea condensation product reactant for Species A. The resulting tetraethylene pentamine and pentaethylene hexamine-urea condensation product has a nitrogen content of about 32 weight percent.

That mixed $N_1,N_3$-symmetrically bis-substituted urea product of 32 weight percent nitrogen is reacted with the solution of 960 molecular weight polybutenyl substituted succinic anhydride in the same molar ratio of reactants and in the same manner as described for Species A. The resulting solution contains Species B and has a nitrogen content of about 2.4 weight percent.

Preparation of Species C: A 1:1:1 condensation product of polyalkylene polyamine: formaldehyde: $C_{50+}$ alkylated phenol further condensed with formaldehyde Species C is a double condensation product. It is prepared by first condensing at one time equimolecular proportions of tetraethylene pentamine, formaldehyde and a 1600 number average molecular weight alkylated phenol whose alkyl group is derived from a liquid viscous polybutene, is substituted substantially only on the benzene ring carbon para with respect to the hydroxyl group of phenol and is the only alkyl substituent on the benzene ring of phenol. The condensation produces water as a by-product and hence is conveniently carried out at a temperature above 212° F. to facilitate removal of by-product water. For example there are combined in a jacketed reaction kettle about 0.9 to 0.95 molecular proportion of tetraethylene pentamine per mole of the 1600 number average molecular weight alkylated phenol dissolved as a 46 weight percent concentration in SAE–5W oil. The liquid polyamine is added to the stirred solution of the alkylated phenol that has been heated to 170° F. Then formalin containing 37 weight percent formaldehyde in a molar amount equal to the polyamine is added to the stirred hot mixture in the jacketed reaction kettle while injecting nitrogen gas into the liquid. This resulting stirred mixture is heated to and reacted at 300° F. for about two hours, cooled to 200° F. and then a second addition of formaldehyde is made. The second addition of formaldehyde as formalin can be an amount to provide from one-half of up to the same amount first added. Preferably, the second amount of formaldehyde is the same as the first used, i.e. a molar amount equal to the moles of polyamine used. Only about 0.5 mole of formaldehyde per mole of first condensation product enters into the second condensation reaction. The excess formaldehyde reactant assures a more complete second condensation.

After addition of the second amount of formalin, the resulting stirred mixture is heated back to 300° F. and held at that temperature for about 120 minutes. The second condensation also produces water as a by-product. The 120 minute condensation reaction time together with nitrogen gas injection is usually sufficient to cause most of the by-product water to be removed. The resulting solution contains about 41 weight percent Species C as solute. The nitrogen content of the solution is 1.3 weight percent.

Preparation of Species D: A 1:1:1 condensation product of polyalkylene polyamine:formaldehyde:$C_{50+}$ alkylated phenol further condensed with nonylphenol and formaldehyde Species D is also a double condensation product. The first condensation is conducted, as described for Species C, with equimolecular proportions of tetraethylene, formaldehyde and the 1900 number average molecular weight p-polybutenyl substituted phenol used to prepare Species C.

The second condensation differs from that used to prepare Species C in that formaldehyde and p-nonylphenol are used with the first-prepared 1:1:1 condensation product.

For example, the first condensation product is prepared by stirring and heating to 170° F. a mixture of 1330 parts by weight of 1836 number average molecular weight p-polybutyl substituted phenol (532 weight parts, about 0.29 mole) dissolved in SAE–5W oil (798 weight parts) and 0.29 mole tetraethylene pentamine. Thereafter 0.29 mole of formaldehyde added as formalin (37% $CH_2O$) is added and the mixture is stirred and heated to 320° F. and held at that temperature for reactions for two hours using nitrogen gas injection into the hot liquid to aid removal of by-product water. After the two hour reaction period, 0.15 mole of p-nonylphenol is added to the stirred hot reaction mixture which is then cooled to 180° F. and 0.29 mole of the formaldehyde is added as formalin (37% $CH_2O$) for the second condensation reaction.

The ingredients for the second condensation reaction are stirred and heated to 340° F. and held at 340° F. for two hours while injecting nitrogen gas into the hot liquid reaction mixture to assist removal of by-product water. The liquid product of the double condensation is filtered. The filtrate has a nitrogen content of 1.4 weight percent.

The following portion of this disclosure is presented to illustrate the difficulties encountered in attempting to prepare boric acid borated products.

COMPARATIVE I

Boric Acid Boration of Species A

A portion of the solution of Species A prepared as before described is used for this boric acid boration. The solution has a nitrogen content of about 2.4 weight percent as reported before. This solution is stirred and heated to 260° F. and a slurry of boric acid in SAE–5W oil is added as rapidly as feasible without causing excessive foaming. The amount of boric acid added is about 0.3 gram mole per gram atom of nitrogen. The resulting mixture is heated to about 300° F. and held at that temperature for about 3 hours while nitrogen gas is injected into the hot stirred liquid for the last two hours. Additional SAE–5W oil is added to dilute the borated derivative to about 40 weight percent concentration. This product has a nitrogen content of 2.07 percent and a boron content of 0.58 percent, both by weight. Thus the boron to nitrogen weight ratio is 0.28 to 1.0. The boron utilization (boron charged to boron in the product) is about 0.935 or 93.5%. However, the product is hazy. The haze appears to be caused by suspended collidal material. Filtration of the product using filter aids of various particle sizes does not remove the haze. Water content of the hazy filtered product is negligible so the haze does not result from suspended by-product water.

COMPARATIVE II

Boric Acid Boration of Species B

Species B is borated with boric acid in the same manner as described in Comparative I for the boric acid boration of Species A. Although the boric acid utilization is high in the boric acid boration of Species B, the unfiltered and filtered products have a haze apparently caused by suspended colloid-like particles.

COMPARATIVE III

Boric Acid Boration of Species C

Portions of the solution of Species C having 1.3 weight percent nitrogen are reacted with amounts of boric acid to provide ratios of 0.125 to 0.25 boron to nitrogen on a weight basis. Reaction conditions are varied. The end products obtained have poor clarity but suspended particles as determined by light reflection (Tyndall effect) does not account for the poor clarity. In general the boron utilization is rather low as is demonstrated by ratio of boron charged to boron in filtered product varying over the range of 10% up to 45%. These boric acid boration results are shown in Table I that follows. In Table I "Temperature" is temperature at which boric acid was added. All reactions finished at 300° F.

TABLE I.—BORIC ACID BORATION OF SOLUTION OF SPECIES C: 1.3% NITROGEN

| Run | Temperature, °F. | Boron/nitrogen weight ratio | | Percentage boron utilization |
|---|---|---|---|---|
| | | Charged | In product | |
| A | 220 | 0.2 | 0.056 | 28.0 |
| B | 260 | 0.2 | 0.050 | 25.0 |
| C | 260 | 0.2 | 0.057 | 28.5 |
| D | 260 | 0.25 | 0.046 | 18.4 |
| E | 260 | 0.125 | 0.025 | 20.0 |
| F | 290 | 0.2 | 0.082 | 41.0 |
| G | 260 | 0.2 | 0.035 | 17.5 |
| H | 200 | 0.2 | 0.09 | 45.0 |
| I[1] | 260 | 0.2 | 0.07 | 10.0 |

[1] Reboration of product from Run B.

The use of water with boric acid in the ratio of about 5.3 moles water per mole of boric acid increases boron utilization up to about 74% but at the sacrifice of adding a substantial amount of water that must be ultimately removed. Dimethyl formamide also promotes a high utilization of boron in the boric acid boration of Species C but again a large mole ratio of dimethyl formamide to boric acid is required and adds substantially to product cost without a change in its character.

COMPARATIVE IV

Boric Acid Boration of Species D

The solution of Species D has a nitrogen content of 1.4 percent by weight. The boric acid boration of Species D without the use of a promoter results in boron utilizations in the range of 10 to 45 percent and with promoters such as water, methanol and dimethyl formamide results in boron utilizations of 70 to 90 percent but at the sacrifice of using relatively large amounts of promoter that must be removed and not appear in the final product.

The following are examples of the superboration and equilibration according to the present invention.

EXAMPLE 1

Superboration and Equilibration of Species A

The solution of Species A, the preparation of which was described before, has a nitrogen content of about 2.4 weight percent. The objective of this illustrative example is to obtain a boric acid borated derivative of Species A having a weight ratio of boron to nitrogen of about 0.26:1. To accomplish this the superboration reaction is conducted in the following manner.

Superboration

To a steam jacket heated reaction kettle having a stirrer there are added 1730 pounds of solution of Species A, prepared in the same manner as described for the preparation of Species A but omitting the use of SAE-5W oil diluent. This solution of Species A contains about 2.9 weight percent (about 50 pounds) nitrogen. This solution is stirred and heated to 210° F. and at that temperature there is added thereto 383 pounds boric acid to provide 67 pounds boron for a boron to nitrogen charged weight ratio of 1.34:1.0. The boric acid is added as a slurry in 64 gallons of SAE-5W oil. To the stirred mixture there is added 24 gallons of water and the resulting stirred mixture is heated to 280° F. and held at 280° F. while nitrogen gas is injected into the hot liquid until all water, added water and about 1.5 mole of water per mole of boric acid used, is driven off. The resulting solution is filtered while hot. The filtered solution contains 2.08% nitrogen, has a boron content of 2.5% and a boron to nitrogen weight ratio of about 1.2:1. The boron utilization is about 90%.

Equilibration

To the solution of superborated Species A (2400 pounds) there is added 7844 pounds of solution of Species A (2.4% nitrogen) and the resulting solution is stirred and heated to 250° F. and held at 250° F. for one hour. The solution is filtered at 210° F. Before and after filtering the solution has no haze and shows no suspended particles when examined by light for Tyndall-like particle reflection. The filtered solution has a boron to nitrogen weight ratio of 0.263:1.0.

EXAMPLE II

Superboration and Equilibration of Species B

A concentrated form of Species B is first prepared by reducing the SAE-5W oil diluent but otherwise using the same reactants: the urea-(mixed polyamine) condensation product (31% nitrogen) and the polybutenyl substituted succinic anhydride of 960 molecular weight. To 6900 pounds of solution of Species B solution at 210° F. there are added 2400 pounds boric acid slurried in 850 gallons of SAE-5W oil and 150 gallons of water. The mixture is stirred and heated to 280° F. while injecting nitrogen gas into the liquid. The mixture is held at 280° F. for one hour. The product appears to be a uniform solution. The solution is filtered at 250° F. From analysis, the filtrate has 1.39% nitrogen and 1.65% boron for a boron to nitrogen weight ratio of 1.19. The boron utilization is 89%.

Equilibration

The hot filtered solution of superborated Species B is combined with the solution of Species B heated to 290° F. in the amounts of 20,800 pounds of solution of superborated Species B and 48,000 pounds of solution of Species B. The resulting mixture of solutions are stirred at 260° F. for about one hour. The resulting product appears as a homogenous solution and by analysis is found to have 1.9% nitrogen and 0.5% boron for a boron to nitrogen weight ratio of 0.263.

EXAMPLE III

Superboration and Equilibration of Species C

For the superboration of Species C type difficult to boric acid borate p-$C_{50+}$ alkylated phenol:polyamine:formaldehyde double condensation product there is prepared the following solution. A 4000 gallon jacketed kettle vented to an evacuation system (e.g. suction side of steam vacuum jet) and having a stirrer is used. Air in the kettle is displaced with nitrogen and the kettle is charged with 1120 gallons (8000 pounds) of solution containing 48 weight percent 1600 number average molecular weight p-polybutylphenol as solute. The solvent is a mixture of about 61 weight percent SAE-5W oil and 49 weight percent saturated branched chain alkane corresponding to the saturated component of polybutenes of about 2000 number average molecular weight. The solution of p-polybutylphenol is further diluted with 220 gallons SAE-5W oil and the diluted solution is stirred and heated to 150° F. Then 50 gallons commercial tetraethylene pentamine are added and the temperature of the stirred mixture is adjusted to 170° F. To the stirred mixture is added 40 gallons of formalin (37% $CH_2O$). Nitrogen gas is injected into the stirred liquid reaction mixture that is then heated to 300° F. and is held at that temperature for two hours while the vacuum line to the kettle's vapor space is open. Thereafter the gas injection is stopped, the vacuum line shunt off, the solution of Species C is diluted with 400 gallons of SAE-5W oil, cooled to 215° F. and 3800 pounds of boric acid slurried in 500 gallons of SAE-5W oil are added to provide a boron to nitrogen weight ratio of 5:1. Heat is provided to the stirred mixture as needed to prevent the temperature of the kettle's contents from falling below 180° F. Then 228 gallons of water are added to the stirred mixture and the temperature of the stirred mixture is raised to 320° F. Nitrogen gas injection into the stirred reaction liquid is resumed and the vacuum line is opened. Nitrogen gas injection is continued into the stirred 320° F. reaction mixture until all water, added water and by-product water has been removed. About 3 hours is sufficient time to remove all the water when nitrogen gas injection is at 3000 cubic feet per hour. The resulting dry solution is filtered and by analysis is found to contain 3.14% boron and 0.66% nitrogen, both by weight. The boron to nitrogen weight ratio in the product is 4.76, that is, a 95% boron utilization.

Equilibration

The superborated solution ($B/N$ weight ratio of 4.76) is mixed with the solution of Species C (1.3% nitrogen content) in various weight ratios to obtain equilibration products of $B/N$ weight ratios in the range of 0.1 to 0.3. The mixtures are equilibrated at 120° F. with stirring. The amounts of each of the two solutions used are shown in Table II.

TABLE II.—EQUILIBRATION OF SOLUTION—3.14% B AND 0.66% N WITH SOLUTION: 1.3% N

| Equilibration product | Superboration solution, lbs. | Species C solution: 1.3% N, lbl. | Product $B/N$ weight ratio |
| --- | --- | --- | --- |
| A | 18,500 | 437,440 | 0.10 |
| B | 18,500 | 269,746 | 0.16 |
| C | 18,500 | 169,760 | 0.25 |
| D | 18,500 | 130,700 | 0.32 |
| E | 18,500 | 97,440 | 0.42 |
| F | 18,500 | 80,516 | 0.50 |

EXAMPLE IV

Superboration and Equilibration of Species D

The solution of Species D (1.4% N) is superborated in the following manner. A kettle as described in Example III is used. To the kettle after displacing air with nitrogen there is charged 10,000 pounds of solution of Species D (1.4% N) and 150 gallons SAE-5W oil. This diluted solution is stirred and heated to 210° F. Thereafter 4800 pounds boric acid ($B/N$ charge ratio of 6:1) slurried in 600 gallons of SAE-5W oil at 150° F. and then 280 gallons of 200° F. water are added to the stirred dilute solution while maintaining a temperature of the kettle's contents at 180° F. by the addition of heat. The resulting stirred mixture is heated to 360° F. with the vacuum line opened and nitrogen gas injection at 3200 cubic feet per hour is started when the kettle's contents reach 225° F. The kettle's contents are stirred and held at 360° F. for about 3 to 4 hours or until substantially all water has been removed. The resulting solution has a nitrogen content of 0.718 percent, a boron content of 4.13 percent (both by weight) and a $B/N$ weight ratio of 5.75. The boron utilization is 96 percent.

Equilibration

The above-described superborated solution is mixed using 19,550 pounds superborated solution at 360° F. and 195,710 pounds of solution of Species D (1.4% N) at 200° F. with stirring. After one hour of stirring the equilibrated solution is filtered. The filtrate has a $B/N$ weight ratio of 0.28:1.0.

EXAMPLE V

This example illustrates the superboration of Species C using the solution thereof (1.3% N) as prepared without separate preparation of the same as in Example III.

Superboration

To a jacketed kettle having a stirrer and a vacuum line connected to the vapor space of the kettle through a water-cooled condenser, there are charged 10,000 pounds solution of Species C (1.3% N) after displacing the air from the kettle with nitrogen. The solution is stirred and heated to 200° F. and then 5450 pounds of boric acid (to provide a $B/N$ charge ratio of 7.3:1.0) slurried in 1050 gallons of oil at 180° F. are added to the stirred solution in a manner to provide a substantially uniform suspension of boric acid in the kettle. Thereafter 328 gallons of 150° F. water are added to the stirred mixture in the kettle. Heat is supplied by high pressure steam in the jacket of the kettle to heat its stirred contents to 360° F. When the stirred reaction mixture reaches 220° F., nitrogen gas injection at 3000 cubic feet per hour into the stirred fluid mass is started and the vacuum line is opened. Nitrogen gas injection into the stirred fluid mass is continued after the fluid mass reaches 360° F. and until 517 gallons of water are collected. Approximately 11,420 pounds of product are thus prepared.

Equilibration

The equilibration is conducted in a large blending tank having at its bottom a product discharge post connected to the suction side of a centrifugal pump. The discharge from the pump can by the operation of valves be directed in whole or in part to processing for formulation of lubricant oils, to packaging for shipment or through a recycle loop back into the upper portion of and tangential to the blending tank. With the valves on the discharge side of the pump set for full recycle back into the blending and the pump in operation, there are transferred into the blending tank 287,845 pounds (38,380 gallons) of the solution of Species C (1.3% N) at 300° F. (the temperature at the conclusion of its preparation) and then 11,420 pounds 1428 gallons) of the superborated product of this example at 350° F. Mixing by full recycle of fluid withdrawn from the blending tank by the pump and discharge of fluid back into the upper portion of the blending tank for about one hour produces not only a uniform mixture but also accomplishes the equilibration. The resulting hot solution is pumped through a filter into a storage tank. The filtered product has no suspended solids and has a $B/N$ weight ratio of 0.235:1.0. From the boron in the final product and the boron in the boric acid charged to superboration, the boron utilization is 96%.

EXAMPLE VI

The superboration and equilibration steps of Example V is repeated except that the solution of superborated product and the solution of Species C (1.3% N) are both permitted to cool to 120° F. before they are charged to the blending tank. The mixture of solutions are pumped around the recycle loop for two days and then pumped through a filter into a storage tank. The filtered product has $B/N$ weight ratio of 0.235:1.0. Samples taken from various levels in the storage tank including a discharge sample from the bottom and taken at different lengths of time in storage at about the same levels will have a $B/N$ weight ratio of 0.235:1.0.

We have discovered for the superboration with boric acid of the difficult to borate oil-soluble nitrogen-containing detergent-dispersant compounds before disclosed and defined as illustrated by Species A, B, C and D that the amount of water required for promotion of superboration to achieve 90 to 96 percent boron utilization is less than the water required for promotion of ordinary boric acid boration to $B/N$ weight ratios in the range of 0.1:1.0 to 0.5:1.0. We have also discovered that in addition to providing the high boron utilization in superboration of the double condensation products from $C_{50+}$ alkyl substituted phenol, polyamine and formaldehyde (Species B and C and Example III and IV type compositions) the water used advantageously effects both the filterability and viscosity of the solutions of the superborated products. In general the use of water above 0.1 part up to 0.6 part, desirably 0.3 to 0.6 part and preferably 0.4 to 0.6 part, per part of boric acid on a weight basis not only increases boron utilization to the level of 90 to 96% but also causes a decrease in the viscosity of the solution of superborated product even though all the water is ultimately removed. Also we have discovered that the boric acid can be added for superboration at temperatures up to the temperature at which boric acid dehydrates to its ortho acid form and then reacted at much higher temperatures with the nitrogen-containing difficult to borate oil-soluble detergent-dispersant compounds. In fact, the superboration reaction (reaction after all boric acid is added) is advantageously carried out at 300° to 380° F. to prepare superborated products with B/N ratios in the range of 3:1 to 7:1 and upward. For B/N ratios in the 3:1 to 6:1 range the superboration temperature preferably is in the range of 310° to 340° F. but higher temperatures do not appear to be disadvantageous to either end product viscosity or high boron utilization of 90 to 96% and higher. For B/N ratios above 6:1 superboration to high boron utilization, 90 to 96% and higher, with no adverse effect on end product viscosity is advantageously conducted at 330° to 360° F. and even as high as 380° F.

To illustrate the utility of the superborated-equilibrated products of this invention as lubricant oil formulations, the following formulated crankcase lubricating oils are prepared using the product of Run B of Example III.

FORMULATION A

| Ingredient: | Volume percent |
|---|---|
| Product of Run B of Example III | 5.0 |
| Oil solution of zinc dialkyldithiophosphate—percent Zn | 0.8 |
| Oil solution of magnesium sulfonate—300 TBN [1] | 2.0 |
| Base stock oil with viscosity index improver for 5W–30 oil | 92.2 |
| | 100.0 |

[1] 300TBN is total base number 300.

FORMULATION B

| Ingredient: | Volume percent |
|---|---|
| Product of Run B of Example III | 3.0 |
| Oil solution of zinc dialkyldithiophosphate—percent Zn | 0.7 |
| Oil solution of magnesium sulfonate—300 TBN [1] | 1.0 |
| Base stock oil with viscosity index improver for 10W–30 oil | 95.3 |
| | 100.0 |

[1] 300 TBN is the total base number.

Oil Formulation A is used in the standardized test with Ford V–8 engine of 289 cubic inch displacement with plugged positive crankcase ventilating valve (most severe testing for inhibiting varnish and sludge deposits). Oil Formulation B is used in standardized test with Lincoln V–8 engine and Sequence VB. The overall sludge and varnish deposits are rated in both of those engine tests on a scale of 0 to 50 where a rating of 50 is for a sludge or varnish free engine and a rating of 0 is for very heavy deposits of sludge or varnish. The inspection of the test engine parts after disassembly of the test engines following the prescribed operation of the engines is done visually and the ratings are made by comparison of parts with certain pictorial standards having ratings over the range of 0 to 50. The results of these tests are as follows:

Ford 289 V–8 Engine Test
Using Oil Formulation A

| | Rating |
|---|---|
| Sludge | 49 |
| Varnish | 43 |

Lincoln V–8 Engine Test-Sequence VB
Using Oil Formulation B

| | Rating |
|---|---|
| Sludge | 47 |
| Varnish | 43 |

The superboration and equilibration steps of this invention can be used on other species of the bis-($C_{50+}$ alkenyl substituted succinimide) of di(aminopolyazalkyl) substituted ureas and the products of $C_{50+}$ alkyl substituted phenol, polyamine and formaldehyde condensation before described as difficult to borate with boric acid, defined as to types of compounds and exemplified by Species A, B, C and D in the manner illustrated by Examples I through VI with substantially the same successful attainment of high boron utilization from boric acid.

We claim:
1. The process for preparing an oil soluble boron and nitrogen containing composition having a boron to nitrogen ratio in the range of from 0.1 to 0.5 throughout which comprises adding at a temperature of 180° F. to 220° F. boric acid and water in a weight ratio of 2 to 5 parts boric acid per part of water to a hydrocarbon oil solution of a polyamine product produced by mixing together in equimolecular proportions a para-alkyl phenol, wherein the alkyl group has 30 to 20,000 carbon atoms, formaldehyde and an alkylene polyamine of the formula

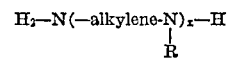

wherein X is an integer of from 2 to about 10, the alkylene group has 1 to 8 carbon atoms, and R is hydrogen or an alkyl group of 1 to 4 carbon atoms, heating at a temperature of 180° F.–320° F. to drive off by-product water, adding about one half again as much of a saturated hydrocarbyl substituted phenol having 2 to 20,000 carbon atoms in the hydrocarbyl group, and the same amount of formaldehyde as initially added, heating to 300° F.–340° F. to again drive off by-product water and recovering said product; said boric acid being added to provide an elemental boron to nitrogen ratio of 2 to 10, heating the resulting boric acid—polyamine mixture in the range of 220° F. to 400° F. to remove all water, filtering the resulting oil solution of boron containing product at a temperature in the range of 220° F. to 400° F., mixing the filtered product with an additional amount of the oil solution of said polyamine product, said amount being sufficient to provide a final boron to total nitrogen ratio in the range of 0.1 to 0.5, and equilibrating the resulting mixture to a uniform boron to total nitrogen ratio of 0.1 to 0.5 throughout.

2. The process for preparing an oil soluble boron and nitrogen containing composition having a boron to nitrogen ratio in the range of from 0.1 to 0.5 throughout which comprises adding at a temperature of 180° F. to 220° F. boric acid and water in a weight ratio of 2 to 5 parts boric acid per part of water to a hydrocarbon oil solution of a polyamine product produced by mixing together in equimolecular proportions a para-alkyl phenol, wherein the alkyl group has 30 to 20,000 carbon atoms, formaldehyde and an alkylene polyamine of the formula

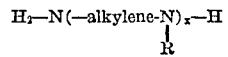

wherein X is an integer of from 2 to about 10, the alkylene group has 1 to 8 carbon atoms, and R is hydrogen or an alkyl group of 1 to 4 carbon atoms, heating at a temperature of 180° F.–320° F. to drive off by-product water, adding an additional amount of from one half to the same amount of formaldehyde as initially added, heating to 300° F.–340° F. to again drive off by-product water and recovering said product; said boric acid being added to provide an elemental boron to nitrogen ratio of 2 to 10, heating the resulting boric acid-polyamine mixture in the range of 200° F. to 400° F., maintaining a temperature in the range of 200° F. to 400° F. to remove all water, filtering the resulting oil solution of boron containing product at a temperature in the range of from 220° F. to 400°

F., mixing the filtered product with an additional amount of the oil solution of said polyamine product, said amount being sufficient to provide a final boron to total nitrogen ratio in the range of 0.1 to 0.5, and equilibriating the resulting mixture to a uniform boron to total nitrogen ratio of 0.1 to 0.5 throughout.

3. The method of claim 2 wherein the filtered product and the oil solution of the polyamine product are at ambient temperature when mixed and the equilibration is carried out by storing the mixture at ambient temperature.

4. The method of claim 2 wherein the mixture of filtered product and the oil solution of the polyamine product is equilibrated at a temperature in the range of 120° to 250° F.

References Cited

UNITED STATES PATENTS

| | | | |
|---|---|---|---|
| 2,216,618 | 10/1940 | Katz | 260—462 X |
| 3,000,916 | 9/1961 | Klass et al. | 260—462 X |
| 3,087,936 | 4/1963 | Le Suer | 260—326.5 F X |
| 3,297,737 | 1/1967 | Weck | 260—462 |

LEON ZITVER, Primary Examiner

L. B. DE CRESCENTE, Assistant Examiner

U.S. Cl. X.R.

252—51; 260—552 R, 326 N, 326.5 F, 326.3, 553 A